United States Patent
Dymond

[11] Patent Number: 6,020,289
[45] Date of Patent: Feb. 1, 2000

[54] POLYMERS FOR DRILLING AND RESERVOIR FLUIDS AND THEIR USE

[75] Inventor: Brian Dymond, West Yorkshire, United Kingdom

[73] Assignee: Ciba Specialty Chemicals Water Treatments Limited, Bradford, United Kingdom

[21] Appl. No.: 08/952,522

[22] PCT Filed: May 22, 1996

[86] PCT No.: PCT/GB96/01224

§ 371 Date: Feb. 24, 1998

§ 102(e) Date: Feb. 24, 1998

[87] PCT Pub. No.: WO96/37572

PCT Pub. Date: Nov. 28, 1996

[30] Foreign Application Priority Data

May 23, 1995 [GB] United Kingdom .................. 9510396

[51] Int. Cl.7 ........................................................ C09K 7/02
[52] U.S. Cl. ......................... 507/120; 507/118; 507/119
[58] Field of Search ..................................... 507/120, 118, 507/119; 166/305.1

[56] References Cited

U.S. PATENT DOCUMENTS

| | | | |
|---|---|---|---|
| 3,296,126 | 1/1967 | Diener et al. ...................... | 252507/118 |
| 3,323,603 | 6/1967 | Lummus et al. ...................... | 507/120 |
| 4,500,437 | 2/1985 | Engelhardt et al. .................... | 252/8.55 |
| 4,554,081 | 11/1985 | Borchardt et al. ...................... | 252/8.5 |
| 4,757,862 | 7/1988 | Naiman et al. ........................ | 507/120 |
| 4,804,793 | 2/1989 | Lai et al. .............................. | 507/118 |
| 4,921,621 | 5/1990 | Costello et al. ....................... | 507/120 |
| 4,988,450 | 1/1991 | Wingrave et al. ..................... | 507/120 |

FOREIGN PATENT DOCUMENTS

| | | | |
|---|---|---|---|
| 0 295 614 | 12/1988 | European Pat. Off. .......... | C09K 7/02 |
| 0 331 044 | 9/1989 | European Pat. Off. ........ | E21B 43/25 |
| 2 003122 | 11/1969 | France ............................ | C10M 7/00 |
| 1 300 481 | 3/1968 | Germany . | |
| 39 36 698 | 5/1990 | Germany ........................ | C09K 7/02 |
| 2225364 | 5/1990 | United Kingdom . | |

*Primary Examiner*—Philip Tucker
*Attorney, Agent, or Firm*—David R. Crichton

[57] ABSTRACT

Aqueous drilling and reservoir fluids are provided comprising polymers with shale and clay inhibition characteristics. These polymers are dissolved in the fluid and are formed from 50 to 100 mo % monomers of formula (I), wherein $R^1$ is selected from H and $C_1$ to $C_4$ alkyl groups; $R^2$ is selected from $C_1$ to $C_4$ alkyl groups, $—C(CH_3)_2CH_2COCH_3$, $—CH{=}CH_2$ and $—C(CH_3){=}CH_2$. $R^3$ is selected from H, $C_1$ to $C_4$ alkyl groups, $CH_2{=}CH—$ and $CH_2{=}C(CH_3)—$; wherein when $R^3$ is H or $C_1$ to $C_4$ alkyl then $R^1$ is H and $R^2$ is $—CH{=}CH_2$ or $—C(CH_3){=}CH_2$ and when $R^2$ is $—C(CH_3)_2CH_2COCH_3$ then $R^1$ is H; 0 to 50 mol % other ethylenically unsaturated non-ionic monomers and 0 to 20 mol % ionic ethylenically unsaturated monomers and the polymer has a molecular weight of below 1 million.

6 Claims, No Drawings

POLYMERS FOR DRILLING AND RESERVOIR FLUIDS AND THEIR USE

This invention relates to novel aqueous drilling fluids comprising particular classes of polymer which act as inhibitors of shale disintegration or swelling ("shale inhibitors") during the drilling of wells. It also relates to processes of using the drilling fluids and minimising shale disintegration. The polymers are also useful for inhibiting clay swelling, disintegration or dispersion within fluids used for oil or gas reservoir treatment and permeation.

It is known to use aqueous based fluids in drilling processes to carry rock materials out of the drilled well. When drilling is carried out in a formation formed from the minerals known as shales major problems can result from interaction of water in the drilling fluid with the shale. Water tends to become absorbed into the shale which is caused to swell or weaken, thus disrupting its internal structure. This can lead to contraction of the wellbore and softening and disintegration of the wall of the well shaft. This in itself is problematic. Furthermore, parts of the rock may become detached from the wall of the well and increase the viscosity and solids content of the drilling fluid passing through the well. Use of oil-based drilling fluids would alleviate these problems, but such fluids tend to be expensive and are thought of as environmentally undesirable. Therefore methods have been sought for inhibition of shale disintegration ("shale inhibition") when using aqueous drilling fluids.

Similar problems occur with swelling and disintegration of clay materials within oil- and gas-bearing reservoirs on contact with aqueous reservoir fluids. Such swelling tends to lead to permeability problems within these reservoirs. Therefore it is also desired to provide methods of inhibiting disintegration of clay ("clay inhibition") in such environments.

It is known to incorporate various polymeric materials into drilling fluids for various purposes. These various polymeric materials are directed to a range of problems which may be encountered during drilling, depending upon the rock type in which drilling is taking place. In general, if it is known, from prior analysis or from past experience, that a particular rock will give a particular problem, such as shale or clay disintegration, then suitable additives are included in the drilling fluid in order to prevent such problems or alleviate them if they arise. Alternatively, if it is not known which problems are likely to arise, drilling is usually begun with a simple basic drilling fluid. If problems are observed to arise during drilling appropriate additives are then included in the fluid. Therefore if it is observed that the shale or clay disintegration is occurring, a shale or clay inhibitor is added to the fluid.

Various polymeric materials are known for incorporation into drilling fluids as shale inhibitors. High molecular weight (5 to 15 million daltons) polyacrylamides and acrylamide/acrylate copolymers (anionic polyacrylamides) are known for this purpose. They are believed to work by absorbing onto the shale, coating it and preventing penetration by water. However, it is common to incorporate bentonite as a component of drilling fluids as a viscosifier. Polyacrylamides, in particular anionic polyacrylamides, tend to absorb onto the surface of bentonite in the drilling fluid and portions of the polymer dose are lost.

U.S. Pat. No. 4,440,649 suggest the use of a vinyl amide-vinyl sulphonate terpolymer with acrylamide for the prevention of disintegration of clay-containing materials. The terpolymer suggested is described in U.S. Pat. No. 4,309,523. All of the exemplified polymers contain 2-acrylamide-2-methyl-propane-3-sulphonic acid (AMPS). Amounts of AMPS are often very high, for instance at least 50 wt %, often at least 65 wt %. The vinyl amide used is N-vinyl-N-methyl-acetamide, vinyl acetamide or vinyl formamide. These monomers are generally present in minor amounts in the exemplified polymers, in particular never more than 50 wt % of the polymer. When such monomers are present in amounts of 50% it is always in combination with significant amounts of AMPS (for instance at least 35 wt %). U.S. Pat. No. 4,536,297 also suggests the use of a vinyl amide-vinyl sulphonate terpolymer for prevention of disintegration of clay-containing materials. This terpolymer is described in DE-A-3,144,770. Again, the exemplified polymers contain significant amounts of anionic monomer, in this case sodium styrene sulphonate. In the terpolymers described the sulphonate is often present in an amount of at least 50 wt %. Amide monomers such as N-vinyl-N-methyl acetamide, N-vinyl formamide are also used. Generally however these are used in minor amounts, in particular in the terpolymers described, in which they are always used in amounts of less than 50 wt %. These predominantly anionic polymers can suffer from similar problems as those seen with anionic polyacrylamides.

It is also known to use rather low molecular weight highly cationic polymers, such as diallyl dimethyl ammonium chloride (DADMAC) as shale-inhibiting components of drilling fluids. These act to inhibit disintegration of shale by penetrating the shale and acting to increase its internal strength and reduce swelling on contact with water. Unfortunately, cationic polymers can be highly toxic to sea life. They also have a tendency to absorb onto solid surfaces other than the shale with the result that a portion of the dose is lost and the use of such polymers is inefficient.

It is also known to incorporate polyglycols into drilling fluids as inhibitors of shale disintegration. These act by penetrating the shale and aiding in retaining its internal structure. They are also believed to cause some dehydration of the shale. Polyglycols are generally accepted as the industry standard shale inhibitors.

GB-A-2267921 describes an aqueous based drilling fluid comprising polyvinylpyrrolidone as a shale inhibitor. This is the only material mentioned as shale inhibitor. It is stated that the PVP polymer may have a molecular weight from 5000 upwards, but that it is preferably greater than one million. The examples show that high molecular weight is clearly preferred. It appears that the PVP is acting as a coating polymer to prevent penetration of water into the shale.

Two recent disclosures discuss methods of providing drilling fluids suitable for use in shale formations. WO96/04349 mentions the possibility of including dissolved molecular solutes. These may be polymers. No specific polymers are suggested. WO96/03474 suggests a particular composition which includes a specific surfactant together with a water soluble polymer such as PVP, polyvinyl alcohol, polysaccharide or partially hydrolysed (ie anionic) polyacrylamide.

As explained above, various materials can be added to drilling fluids according to the problems which are encountered in a particular drilling operation. GB-A-2,225,364 discusses materials suitable for use as fluid loss additives. The polymers are copolymers of acrylamide and an N-vinyl amide, which is generally N-vinyl formamide (NVF). In general the NVF is used in minor amounts. The exemplified polymers contain no more than 22 wt % NVF-based monomer. The polymer is subjected to hydrolysis after formation so as to hydrolyse some of the NVF to N-vinyl amine, thus reducing the amount of NVF monomer units present in the polymer. Hydrolysis of the acrylamide is also suggested. Molecular weights of the polymer of from 10,000 to 1,000,000 are suggested.

Various materials are also known for use in other fluids associated with oil recovery. U.S. Pat. No. 5,080,809 is a very broad disclosure of polymers which can be used during oil recovery operations. Some of the polymers exemplified for use in enhanced oil recovery as mobility control agents comprise for instance 60 wt % N,N-dimethyl acrylamide (DMAm)/40 wt % N-vinyl-2-pyrrolidone (VP) copolymers and 50/50 copolymers of the same monomers. 50 wt % N-methyl-N-vinyl acetamide (NMVA)/ 50 wt % acrylamide copolymers are also described, but no particular use for these is stated. Copolymers of 80 wt % DMAm and 20 wt % 3-methacryloyloxypropanesulphonic acid (SPM) are also suggested for mobility control in enhanced oil recovery, as is a similar terpolymer with 10 wt % AMPS replacing 10 wt % of the SPM.

According to a first aspect of the invention we provide an aqueous drilling or reservoir fluid comprising as a shale or clay inhibitor a dissolved polymer formed from ethylenically unsaturated monomer or monomer blend, the blend comprising 50 to 100 mol % monomers of the formula (I):

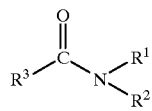

wherein
$R^1$ is selected from H and $C_1$ to $C_4$ alkyl groups
$R^2$ is selected from $C_1$ to $C_4$ alkyl groups, $—C(CH_3)_2CH_2COCH_3$, $—CH=CH_2$ and $—C(CH_3)=CH_2$
$R^3$ is selected from H, $C_1$ to $C_4$ alkyl groups, $CH_2=CH—$ and $CH_2=C(CH_3)—$
wherein when $R^3$ is H or $C_1$ to $C_4$ alkyl then $R^1$ is H and $R^2$ is $—CH=CH_2$ or $—C(CH_3)=CH_2$
and when $R^2$ is $—C(CH_3)_2CH_2COCH_3$ then $R^1$ is H
0 to 50 mol % other non-ionic ethylenically unsaturated monomers,
and 0 to 20 mol % ethylenically unsaturated ionic monomers
and the polymer has a molecular weight of below 1 million.

We find that the use of aqueous drilling fluids containing these substantially non-ionic polymers gives better results than the use of polyacrylamide, anionic polyacrylamide and other anionic polymers, especially at high temperatures. The polymers are non-toxic to sea life, unlike predominantly cationic polymers. We also find that they give shale inhibition performance improved over the industry standard, polyglycol. We find also that the fluids give improved clay inhibition performance when they are reservoir fluids.

The invention is applicable also to workover and completion fluids as well as drilling and reservoir fluids and references to drilling and reservoir fluids should be interpreted accordingly. It is preferred in the invention that the fluid is one to be used as a drilling or reservoir fluid.

Without wishing to be limited by theory, we believe that the low molecular weight, substantially non-ionic polymers in the aqueous fluid of the invention act by penetrating the shale or clay and aiding retention of its internal structure. Consequently swelling and disintegration is inhibited. We also find that the fluids of the invention can reduce penetration of water into the shale or clay.

The polymer is dissolved in the aqueous fluid. It is usually present in amounts up to 5%, often 0.5 to 3%, preferably 1 to 3%, by weight of fluid. It is important that the polymer is dissolved. Highly soluble polymers may be included in the fluid in amounts at the higher end of the above ranges. Polymer of lower solubility may be included in amounts at the lower ends of these ranges to ensure it is dissolved.

The polymer is chosen to ensure that it is soluble in the aqueous fluid in the amounts required for the application in which it is to be used. Various factors can affect solubility of the polymer. These include choice of monomer or monomers within the formula (I), choice of other comonomers if any and molecular weight of the polymer.

The polymer in the aqueous fluid of the invention is of low molecular weight and so must be below 1 million daltons, generally 700,000 daltons or less, preferably 500,000 daltons or less, more preferably 200,000 daltons or less, most preferably 20,000 to 50,000 daltons. We believe that polymers of lower molecular weight can more effectively penetrate the shale and impart to it internal strength. Throughout this specification molecular weight is weight average molecular weight measured by gel permeation chromatography (GPC).

The method used is as follows:

a filtered and degassed aqueous buffer is pumped through a set of Toso Haas TSK PWXL columns (G6000+ G3000+guard) connected to a differential refractometer, using an HPLC pump. The flow rate is set at 0.5 ml/min and the columns are housed in an LC oven set at 40° C. Polymer solutions are injected onto the GPC system using a 100 μl loop connected to an injection valve. The columns are calibrated using commercially available polyethyleneoxide and polyethyleneglycol standards. Weight average molecular weight is calculated using commercially available computer software connected to the GPC system. The buffer may be an aqueous acetate buffer, in which case polymer solutions are injected at a concentration of approximately 0.2%. Alternatively the buffer may be 0.1M aqueous phosphate buffer in which in which case polymer solutions have an approximate concentration of 0.15%. Any equivalent method may be used.

Viscosity of the polymers is usually 160 cS or below, often 100 cS or below, preferably 15 cS or below and is generally at least 2 cS or 3 cS (measured as 5% aqueous solution viscosity by suspended level viscometer at 25° C.).

Choice of the substituents $R^1$, $R^2$ and $R^3$ also has an influence on solubility. In general, the longer the carbon chains chosen as substituents $R^1$ and $R^2$ the lower the solubility of a polymer containing that monomer.

The groups $R^1$ and $R^2$ may each be a $C_1$ to $C_4$ alkyl group. Polymers containing monomers in which $R^1$ and/or $R^2$ is a $C_4$ alkyl group tend to have lower solubility than those in which these groups are $C_1$ to $C_3$ alkyl. Monomers having the longer $R^1$ and $R^2$ groups can usefully be employed for drilling wells where the temperature of the drilling fluid is rather low in use, for instance where the fluid remains at a temperature of below around 70° C., preferably below around 50° C., often 20 to 40° C., for instance 30° C. or below. Where the temperature of the drilling fluid is likely to rise above 70° C. or higher during use then it is preferred to use polymers containing monomer having shorter chain $R^1$ and $R^2$ groups, in particular $C_1$ to $C_3$.

The N-substituents, $R^1$ and $R^2$, may each be a $C_1$ to $C_4$ alkyl group. Additionally $R^1$ may be H and $R^2$ may be $—C(CH_3)_2CH_2COCH_3$, $—CH=CH_2$ or $—C(CH_3)=CH_2$. $R^3$ is selected from H, $C_1$ to $C_4$ alkyl groups, $CH_2=CH—$ and $CH_2=C(CH_3)$—. When $R^3$ is alkyl, $C_1$ to $C_3$ are preferred for solubility reasons, as for $R^1$ and $R^2$.

when $R^3$ is H or $C_1$ to $C_4$ alkyl then $R^1$ is H and $R^2$ is —$CH=CH_2$ or —$C(CH_3)=CH_2$, preferably —$CH=CH_2$. In this latter case the monomer of formula (I) is N-vinyl formamide, N-vinyl acetamide or N-vinyl propionamide. N-vinyl formamide is preferred.

When $R^3$ is $CH_2=CH$— or $CH_2=C(CH_3)$— then $R^1$ may be H or $C_1$ to $C_4$ alkyl and $R^2$ may be $C_1$ to $C_4$ alkyl. In such a case the monomer of the formula (I) is a $C_1$ to $C_4$ N-alkyl or N,N-dialkyl (meth) acrylamide. N-methyl and N,N-dimethyl acrylamides, N-ethyl and N,N-diethyl acrylamides, N-methyl, N-ethyl acrylamides and N-isopropyl acrylamides are preferred. It is preferred that the substituents do not contain a total of more than 4, preferably not more than 3, carbon atoms, and in general it is preferred that the acrylamide is monosubstituted where one substituent is a propyl or, in particular, butyl group, for improved solubility. In general $C_1$ to $C_3$ groups are preferred for $R^1$, $R^2$ and $R^3$, in particular where the fluid will be subjected to high (above 70° C.) temperatures during use.

Substituent $R^2$ may also be —$C(CH_3)_2CH_2COCH_3$. When this is the case then $R^1$ is H. In this case $R^3$ is generally $CH_2=CH$—, in which case the monomer of formula (I) is diacetone acrylamide. This monomer is preferably used in low amounts since at high levels it can reduce the solubility of the polymer.

The blend of monomers from which the polymer is formed comprises at least 50% monomer of formula (I). Preferably the polymer is made up of a blend comprising at least 60 or 70% monomer of formula (I) and more preferably is at least 80 and even up to 100% monomer of formula (I). Where 100% of the monomer is of formula (I) the polymer is preferably a homopolymer of a single type of monomer. Particularly preferred homopolymers include N,N-dimethyl acrylamide homopolymer.

Where monomers other than those of formula (I) are present they may be present in amounts of up to 50%, preferably up to 30% or 40%. These comonomers may be any which do not interfere with the shale or clay inhibition function of the polymeric material and are preferably also readily available. Suitable monomers include acrylamide, methacrylamide, vinyl acetate and hydroxy-ethyl acrylate.

The comonomers are preferably non-ionic but the polymer may include ionic (anionic or cationic) monomer in small amounts insufficient to interfere with the shale inhibition function or to provide significant toxicity. Thus amounts of ionic monomer are usually below 20 mol %, preferably below 15 mol %, more preferably below 10 mol %, usually substantially zero. Preferably the polymer is formed from non-ionic monomers only.

Preferred polymers which include a comonomer include a copolymer of a major amount, eg 70 wt %, of N-vinyl formamide and a lesser amount, eg 30 wt %, of acrylamide.

It is important that the polymer has sufficient solubility to be dissolved in the aqueous fluid in effective amounts. Appropriate choice of types and amounts of comonomer allows manipulation of solubility of the polymer for any given type or combination of types of monomer of formula (I).

The polymers used in the aqueous fluid of the invention are usually prepared by polymerisation of monomer or monomer blend in aqueous solution to give an aqueous solution of polymer. Generally therefore monomer or monomer blend is selected so as to ensure that not only the final polymer but the monomer blend from which it is formed are soluble in water in appropriate amounts. If the monomer or monomers of formula (I) are rather low in solubility then appropriate choice of comonomer can give a soluble monomer blend. For instance certain low solubility alkyl or dialkyl acrylamides may be rendered more soluble by blending with acrylamide, which can act as a cosolvent with water.

The monomer blend used is as defined above. Preferably also the monomer blend is reproduced in the monomer units making up the polymer of the invention. That is, the dissolved polymer has a composition of monomer units as defined above for the monomer blend. In particular, it is preferred that the polymer is not treated after polymerisation and before use so as to change the formula of any of the monomer units, for instance by hydrolysis of amides. This is the case particularly for amides of the formula (I). Thus preferably the polymer included in the aqueous drilling fluid comprises a composition of monomer units as defined above for the monomers from which the polymer is formed.

For polymerisation, monomer blend is generally charged in an amount of from 5% to 50% by weight of solution, preferably from 20% to 40% by weight of solution, to give a resulting polymer solution comprising 5% to 50% polymer, preferably 20% to 40%.

The polymers may also be produced by other suitable methods, including reverse phase suspension (bead) polymerisation and reverse phase emulsion polymerisation.

The aqueous fluid of the invention may be a drilling fluid with shale inhibiting activity or a reservoir fluid with clay inhibiting activity. It may also be a workover or completion fluid.

A reservoir fluid of the invention may include any conventional reservoir fluid additives. It may be used in any process which utilises reservoir fluids, for instance in enhanced oil recovery.

Preferably the fluid is a drilling fluid.

An aqueous drilling fluid of the invention may comprise any conventional drilling fluid additives found to be desirable in the circumstances. These include viscosifiers such as clay (e.g. bentonite), xanthan gum and hydroxyethyl cellulose polymer; weighting agents such as barytes and haematite; inorganic salts which aid in shale inhibition, such as sodium chloride, potassium chloride, calcium chloride, potassium carbonate, sodium acetate, and calcium sulphate; other materials added as shale inhibitors or fluid loss additives (where necessary) such as carboxylated celluloses, partially hydrolysed polyacrylamide and starch.

The aqueous drilling fluid of the invention may be used in any conventional drilling process in the same way as known aqueous drilling fluids. The invention thus provides, in a second aspect, a process of drilling a wellbore in shale-containing rock in which material is removed from the rock and flushed in an aqueous drilling fluid to the surface of the wellbore, in which case the aqueous drilling fluid contains as a shale inhibitor a dissolved polymer formed from ethylenically unsaturated monomer or monomer blend, the blend comprising at least 50 mol % monomers of the formula (I):

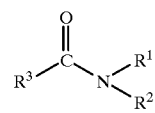

wherein $R^1$ is selected from H and $C_1$ to $C_4$ alkyl groups $R^2$ is selected from $C_1$ to $C_4$ alkyl groups, —$C(CH_3)_2CH_2COCH_3$, —$CH=CH_2$ and —$C(CH_3)=CH_2$ $R^3$ is selected from H, $C_1$ to $C_4$ alkyl groups, $CH_2=CH$— and $CH_2=C(CH_3)$— wherein when $R^3$ is H or $C_1$ to $C_4$ alkyl then $R^1$ is H and $R^2$ is —$CH=CH_2$ or —$C(CH_3)=CH_2$ and when $R^2$ is —$C(CH_3)_2CH_2COCH_3$ then $R^1$ is H 0 to 50 mol % other non-ionic ethylenically unsaturated monomers, and 0 to 20 mol % ionic ethylenically unsaturated monomers and the polymeric material has a molecular weight of below 1 million.

In the process of the second aspect of the invention the aqueous drilling fluid and shale-inhibiting polymer may have any of the characteristics described above of the product of the first aspect of the invention.

In a third aspect of the invention we provide a process of drilling a wellbore in rock in which material is removed from the rock and flushed in an aqueous drilling fluid to the surface of the wellbore, comprising identifying that the drilling is conducted through shale and incorporating into the drilling fluid as a shale inhibitor a dissolved polymer formed from ethylenically unsaturated monomer or monomer blend comprising 50 to 100 mol % monomers of the formula (I):

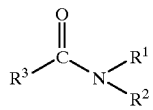

wherein $R^1$ is selected from H and $C_1$ to $C_4$ alkyl groups $R^2$ is selected from $C_1$ to $C_4$ alkyl groups, $—C(CH_3)_2CH_2COCH_3$, 13 $CH=CH_2$ and $—C(CH_3)=CH_2$.

$R^3$ is selected from H, $C_1$ to $C_4$ alkyl groups, $CH_2=CH—$ and $CH_2=C(CH_3)—$ wherein when $R^3$ is H or $C_1$ to $C_4$ alkyl then $R^1$ is H and $R^2$ is $—CH=CH_2$ or $—C(CH_3)=CH_2$ and when $R^2$ is $—C(CH_3)_2CH_2COCH_3$ then $R^1$ is H 0 to 50 mol % other ethylenically unsaturated non-ionic monomers and 0 to 20 mol % ionic ethylenically unsaturated monomers and the polymer has a molecular weight of below 1 million.

In the third aspect of the invention identification that the drilling is conducted through shale can be carried out prior to drilling, for instance by observation of prior drilling operations in the area or by other means of analysing the rock content. It may also be done by observation of changing conditions during drilling, for instance those which are generally observed as a result of shale disintegration. These can include increased viscosity and/or solids content of the drilling fluid.

In a fourth aspect of the invention there is provided the use as a shale inhibitor, in a process of drilling a wellbore in rock in which material is removed from the rock and flushed in an aqueous drilling fluid to the surface of the wellbore, of a dissolved polymer formed from ethylenically unsaturated monomer or monomer blend comprising 50 to 100 mol % monomers of the formula (I):

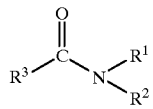

wherein $R^1$ is selected from H and $C_1$ to $C_4$ alkyl groups $R^2$ is selected from $C_1$ to $C_4$ alkyl groups, $—C(CH_3)_2CH_2COCH_3$, $—CH=CH_2$ and $—C(CH_3)=CH_2$.

$R^3$ is selected from H, $C_1$ to $C_4$ alkyl groups, $CH_2=CH—$ and $CH_2=C(CH_3)—$ wherein when $R^3$ is H or $C_1$ to $C_4$ alkyl then $R^1$ is H and $R^2$ is $—CH=CH_2$ or $—C(CH_3)=CH_2$ and when $R^2$ is $—C(CH_3)_2CH_2COCH_3$ then $R^1$ is H 0 to 50 mol % other ethylenically unsaturated non-ionic monomers and 0 to 20 mol % ionic ethylenically unsaturated monomers and the polymer has a molecular weight of below 1 million.

In the third and fourth aspects of the invention the aqueous drilling fluid and shale-inhibiting polymer may have any of the characteristics described above in respect of the product of the first aspect of the invention.

The invention will now be illustrated with reference to the following examples. The examples relate to inhibition of shale disintegration but similar compositions and testing methods are applicable to inhibition of clay disintegration.

EXAMPLE 1

Preparation of a 70:30 wt/wt N-Vinyl Formamide:Acrylamide Copolymer

A monomer solution was prepared by mixing 875.8 g of water, 68.1 g of N-vinyl formamide and 56.1 g of a 52.1% aqueous solution of acrylamide monomer. This mixture was charged to a resin pot equipped with a mechanical stirrer, thermometer and condenser and deoxygenated for 1 hour with a nitrogen sparge. Towards the end of the sparging period the monomer mixture was brought to reflux using an oil bath. Once at reflux sparging was discontinued and a nitrogen blanket maintained.

The monomer mixture was initiated by an initial addition of 0.5 ml thioglycolic acid and 0.05 g of 2,2' azobis(2-amidino propane)dihydrochloride followed by the continuous addition over a period of 4 hours of 6.5 g 2,2' azobis (2-amidino propane)dihydrochloride dissolved in 38 g of water. Throughout the reaction the polymerising mixture was maintained at reflux.

The polymer solution was allowed to cool resulting in a 70:30 N-vinyl formamide:acrylamide copolymer (polymer J) with a solids content of 9.15%.

EXAMPLE 2

Preparation of a dimethyl acrylamide homopolymer

Using the same conditions and procedures described in Example 1 a homopolymer of dimethyl acrylamide (polymer A) was prepared from a monomer solution consisting of 102.9 g of dimethyl acrylamide at 97.2% active dissolved in 897.1 g of water.

EXAMPLE 3

This gives a comparison between polymer A (weight average molecular weight 280,000 by GPC as described above) of the invention and (i) a polyglycol (DCP208 from BP Chemicals) and (ii) a DADMAC (diallyldimethylammonium chloride) homopolymer of weight average molecular weight approx 100,000 determined by GPC as described above with acetate buffer and 0.2% polymer concentration. Both have been utilised successfully as commercial shale inhibitors. The polymers were tested for effectiveness as follows:

Laboratory Performance Evaluation

To test the effectiveness of inhibiting chemicals in the laboratory, a suitable shale substrate is utilised. In these examples 2–4 mm particles of sodium montmorillonite, often cited as one of the most troublesome hydratable shale minerals, were sourced in lump form from a bentonite producer in Wyoming.

37.5 g of shale particles are statically soaked in 87.5 cm³ of aqueous test fluid for approximately 16 hours at set temperatures prior to screening through a 0.5 mm sieve to recover the relatively intact shale remaining. Any weakened or fragmented shale smaller than this size is washed away using a 15 ppb KCl wash fluid. The oversize shale is recovered and weighed wet. A portion is tested for its hardness. High hardness value is indicative of retaining a relatively undamaged intact structure and is a measure of shale inhibition by the polymer. The moisture content of another portion is determined by drying at 110° C. A low value is indicative of resistance to imbibing water and is also a measure of the influence of added polymer on inhibition of shale hydration. The total amount of shale recovered on a dry % basis (minus moisture) is termed % Recovery and is often influenced by polymers, usually of high molecular weight, which physically encapsulate the shale. This measurement is a combination of the weakening of shale structure due to hydration or swelling and an opposing strengthening of structure due to external encapsulation. A high % recovery value indicates good shale inhibition.

Shale hardness is determined by placing a set weight or volume of recovered shale in a cylindrical container of chosen dimensions and measuring the force necessary to effect the penetration of a flat face cylindrical probe of 0.85 cm radius a distance of 1.5 centimeters into the sample. The final force required is quoted and is a measure of the deformation resistance i.e. hardness or strength of the shale sample. This is quoted as the Peak Load (in Newtons) in these examples.

Additive level in this example was 3% wt/wt on a 15 ppb KCl solution in tapwater. Tests were done at ambient temperature using 17 g recovered shale. Results are shown in Table 1 below

TABLE 1

| Additive | Peak Load (N) | Moisture Content (%) | Recovery* (%) |
|---|---|---|---|
| Control (no additive) | 158 | 34.0 | 69.3 |
| Polymer A | 402 | 29.1 | 103.3 |
| Polyglycol | 258 | 32.6 | 84 |
| polyDADMAC | 355 | 29.2 | 102.1 |

*Values of Recovery can marginally exceed 100% due to the minor presence of chemicals dried from the inhibitive fluid imbibed within the shale.

This example illustrates the excellent performance shown by polymer A in preventing shale disintegration. In particular it enables the shale to retain a hardness value as high as or even higher than that obtained with the polyDADMAC. It also appears to prevent ingress of moisture into the shale to an extent comparable with the polyDADMAC and better than the polyglycol (the industry standard).

It is surprising that the NNDMA polymer A gives a result at least as good as a cationic inhibitor, which conventional teaching would expect to have an advantageous inhibiting action by being capable of counter-ionic displacement of sodium ions on the surface of clay. The polyglycol is believed to have site bonding capabilities on clay via Silanol groups. It cannot be expected that an NNDMA polymer would have a superior effect.

EXAMPLE 4

Acrylamide is listed in the literature as a component of shale inhibiting polymers. Usually this is as a comonomer with sodium acrylate (or via partial hydrolysis of the homopolymer to give part conversion to sodium acrylate), and also at very high molecular weight exceeding 5 million. These acrylamides are categorised as encapsulating polymers and utilised at additive levels only up to about 0.5% as higher levels give intolerable increases in drilling fluid viscosity. However in order to compare the product of the invention with an acrylamide polymer at the high dosage levels required for primary inhibition, two samples of closely similar and appropriate molecular weight are evaluated, i.e.

i) A homopolymer of acrylamide of 5% aqueous solution viscosity of 10.9 cS (Comparative Polymer H).
ii) A homopolymer of NNDMA of 5% aqueous solution viscosity of 12.2 cS (Polymer A).

The shale inhibition performance was tested as described in Example 3 with results in Table 2 as follows for 17 g shale.

In this example the hardness improvement due to additives is quoted as an increase over the values given by a control base fluid without additives.

| Additive | Dosage (% wt/wt) | Temperature | Peak Load (above control) N | Moisture Content (%) | Recovery |
|---|---|---|---|---|---|
| Comparative | | | | | |
| Polymer H | 1 | 78 | 99.5 | 35.8 | 79.3 |
| Polymer A | 1 | 78 | 141.5 | 32.5 | 103.7 |
| Comparative | | | | | |
| Polymer H | 1 | 160 | 3.5 | 40.7 | 74 |
| Polymer A | 1 | 160 | 269.5 | 33.6 | 104.8 |
| Comparative | | | | | |
| Polymer H | 3 | 78 | 205 | 36.1 | 104.4 |
| Polymer A | 3 | 78 | 239 | 30.5 | 105.2 |
| Comparative | | | | | |
| Polymer H | 3 | 160 | 82 | 40.1 | 99.8 |
| Polymer A | 3 | 160 | >405 | 30.3 | 108.5 |

The results show improved hardness, and recovery with reduced shale moisture for the NNDMA polymer A compared with a similar molecular weight polyacrylamide. Polymer A is particularly advantageous at high temperatures.

EXAMPLE 5

Although conventional encapsulating PHPA (partially hydrolysed polyacrylamide) products are of high molecular weight and cannot be utilised at the high dosages necessary for primary inhibition exemplified by polyglycols, in order to confirm the benefits of a product of the invention over this chemical species, a PHPA product of low molecular weight was prepared as comparative polymer I and tested in comparison.

The polymer concentration tested was 4 ppb in a base fluid of 15 ppb KCl. Also included for comparison was a poly DADMAC cationic inhibitor. A 21 g column of recovered shale was used in this case with results in Table 3 as follows.

TABLE 3

| | Peak Load (N) | Wet Recovery (% wt/wt) |
|---|---|---|
| PolyDADMAC | 425 | 70.3 |
| Comparative Polymer I | 268 | 52.8 |
| Polymer A | 437.5 | 80.1 |

Again polymer A shows improved results over both Comparative polymer I and polyDADMAC.

EXAMPLE 6

A copolymer of 70 parts by weight N-vinyl Formamide with 30 parts by weight acrylamide at weight average molecular weight=109,000, (measured using GPC as described above) polymer J, (prepared as in Example 1) was evaluated by the method detailed in Example 3 at ambient temperature with the following results, in comparison with DCP 208, a polyglycol. In this example the hardness improvement due to additives is quoted as an increase over the values given by a control base fluid without additives.

TABLE 4

| Dosage (% wt/wt) | Peak Load (above control) (N) | Moisture Content (%) | Recovery |
|---|---|---|---|
| Polyglycol:1 | 109 | 33.7 | 81.6 |
| Polyglycol:3 | 215 | 34.4 | 89.1 |
| Sample J:1 | 174 | 32.5 | 99.9 |
| Sample J:3 | 299 | 32.0 | 103.1 |

The N-vinylformamide copolymer gives a useful shale inhibiting performance exceeding that of a standard commercial product.

EXAMPLE 7

A range of varying molecular weight polyNNDMA (N,N-dimethyl acrylamide) samples (details below) were prepared and tested after shale exposure at ambient temperature with results as shown in Table 5 in comparison with DCP208, a polyglycol, all at 3% dosage on a 15 ppb KCl base fluid.

TABLE 5

| Sample | Peak Load (N) | Moisture Content (%) | Recovery (%) |
|---|---|---|---|
| Control | 145 | 40 | 60 |
| Polyglycol | 224 | 39.5 | 72.5 |
| Polymer B | 500 | 30 | 103 |
| Polymer C | 426.5 | 30 | 103 |
| Polymer D | 387 | 32.2 | 103 |
| Polymer E | 350 | 31.8 | 104.6 |
| Polymer F | 340 | 33.2 | 104.7 |

This example demonstrates the effectiveness of further materials of the invention.

Molecular Weight Characterisation of Exemplified Polymers

| | 5% Aqueous Solution Viscosity (cS)[3] | Weight Average Molecular Weight by GPC as described |
|---|---|---|
| Polymer A | 12.2 | 280,000[1] |
| Polymer B | 3.0 | 24,000[2] |
| Polymer C | 6.3 | |
| Polymer D | 8.6 | |
| Polymer E | 107 | |
| Polymer F | 155[4] | 500,000[2] |
| Comparative Polymer H | 10.9 | |
| Comparative Polymer I | 17.1* | |
| Polymer J | | 109,000[1] |

*Viscosity in 1M NaCl at pH7
[1]Using aqueous acetate buffer and 0.2% polymer solution.
[2]Using 0.1M aqueous phosphate buffer and 0.15% polymer solution.
[3]Using Number 2 Suspended Level Capillary Viscometer at 25° C. unless otherwise stated.
[4]Using Number 3 Suspended Level Capillary Viscometer at 25° C.

I claim:

1. A process of drilling a wellbore in shale-containing rock in which material is removed from the rock and flushed by an aqueous drilling fluid to the surface of the wellbore, in which the aqueous drilling fluid contains a dissolved polymer formed from ethylenically unsaturated monomer or monomer blend, characterized in that the monomer or monomer blend consists essentially of (a) from 50 to 100 mol % monomers of the formula (I)

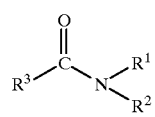

(I)

wherein
$R^1$ is selected from H and $C_1$ to $C_3$ alkyl groups
$R^2$ is selected from $C_1$ to $C_3$ alkyl groups, —C(CH$_3$)$_2$CH$_2$COCH$_3$, —CH=CH$_2$ and —C(CH$_3$)=CH$_2$
$R^3$ is selected from H, $C_1$ to $C_3$ alkyl groups, —CH=CH$_2$ and —CH$_2$=C(CH$_3$)—
wherein when $R^3$ is H or $C_1$ to $C_3$ alkyl groups, then $R^1$ is H and $R^2$ is —CH=CH$_2$ or —C(CH$_3$)=CH$_2$
and when $R^2$ is —C(CH$_3$)$_2$CH$_2$COCH$_3$ the $R_1$ is H (b) 0 to 50 mol % other ethylenically unsaturated non-ionic monomers selected from the group consisting of acrylamide, methacrylamide, vinyl acetate and hydroxy-ethyl acrylate and wherein the monomer or monomer blend contains substantially no ionic ethylenically unsaturated monomers and the polymer has a weight average molecular weight of 200,000 or less.

2. A process according to claim 1 wherein the monomers of formula (I) are selected from $C_1$ to $C_3$ alkyl and dialkyl (meth)acrylamides, N-vinyl formamide, N-vinyl acetamide and diacetone acrylamide.

3. A process according to claim 1 wherein the monomers of formula (1) are selected from N,N-dimethyl acrylamide and N-vinyl formamide.

4. A process according to claim 1 in which the other nonionic monomers comprise acrylamide.

5. A process according to claim 1 in which the monomer blend comprises at least 70% monomers of formula (1).

6. A process according to claim 1 in which the polymer is dissolved in an amount of up to 3% by weight of fluid.

* * * * *